(12) United States Patent
Schmid et al.

(10) Patent No.: US 8,441,237 B2
(45) Date of Patent: May 14, 2013

(54) POWER FACTOR CORRECTION (PFC) CIRCUIT AND METHOD THEREFOR

(75) Inventors: Markus Schmid, Jettingen-Scheppach (DE); Johann Baptist Daniel Kuebrich, Schlüsselfeld (DE); Thomas Antonius Duerbaum, Baiersdorf (DE); Gian Hoogzaad, Mook (NL); Peter Laro, Wijchen (NL); Frans Pansier, Nuenen (NL)

(73) Assignee: NXP B.V., Eindhoven (NL)

( * ) Notice: Subject to any disclaimer, the term of this patent is extended or adjusted under 35 U.S.C. 154(b) by 256 days.

(21) Appl. No.: 12/981,142

(22) Filed: Dec. 29, 2010

(65) Prior Publication Data

US 2011/0188270 A1   Aug. 4, 2011

(30) Foreign Application Priority Data

Dec. 31, 2009 (EP) .................................. 09252937

(51) Int. Cl.
*G05F 1/652* (2006.01)
*G05F 1/656* (2006.01)

(52) U.S. Cl.
USPC ........... 323/223; 323/222; 323/282; 323/284; 323/259; 363/19; 363/20; 363/21.12; 363/21.16; 363/21.17

(58) Field of Classification Search .................. 363/19, 363/20, 21.12, 21.16, 21.17; 323/222, 223, 323/282, 284, 259
See application file for complete search history.

(56) References Cited

U.S. PATENT DOCUMENTS

| | | | | |
|---|---|---|---|---|
| 5,488,269 A | * | 1/1996 | El-Hamamsy et al. | 315/307 |
| 5,598,326 A | * | 1/1997 | Liu et al. | 363/34 |
| 6,034,489 A | * | 3/2000 | Weng | 315/307 |
| 6,049,472 A | | 4/2000 | Suzuki | |
| 6,052,290 A | | 4/2000 | Moreau | |
| 6,181,079 B1 | * | 1/2001 | Chang et al. | 315/247 |
| 6,359,395 B1 | * | 3/2002 | Quazi et al. | 315/307 |
| 6,362,575 B1 | * | 3/2002 | Chang et al. | 315/224 |
| 6,998,795 B2 | * | 2/2006 | Chiou | 315/291 |
| 2003/0161169 A1 | | 8/2003 | Kwon | |
| 2004/0252528 A1 | | 12/2004 | Kuwabara | |
| 2007/0263417 A1 | | 11/2007 | Lin et al. | |

FOREIGN PATENT DOCUMENTS

| | | |
|---|---|---|
| EP | 1 744 440 A2 | 1/2007 |
| JP | 2002-034254 A | 1/2002 |
| JP | 2004-260937 A | 9/2004 |

OTHER PUBLICATIONS

Extended European Search Report for European Patent Appln. No. 09252937.9 (May 20, 2010).

* cited by examiner

*Primary Examiner* — Bao Q Vu

(57) ABSTRACT

Consistent with an example embodiment, a circuit comprises a power factor correction stage having a DC input, a ground input, a DC output and a ground output. The circuit further includes a capacitor; a diode; and a discharge circuit. A first terminal of the diode is connected to an input of the power factor correction stage, a second terminal of the diode is connected to the first plate of the capacitor; and the second plate of the capacitor is connected to the other input of the PFC stage. The discharge circuit is connected to the capacitor and is configured to discharge the capacitor such that it contributes to the output of the PFC stage when the level of a signal at the input of the PFC stage falls below a threshold value.

15 Claims, 13 Drawing Sheets

US 8,441,237 B2

POWER FACTOR CORRECTION (PFC) CIRCUIT AND METHOD THEREFOR

This application claims the priority under 35 U.S.C. §119 of European patent application no. 09252937.9, filed on Dec. 31, 2009, the contents of which are incorporated by reference herein.

FIELD OF THE INVENTION

The present disclosure relates to the field of circuits, in particular, but not exclusively to circuits having a power factor correction (PFC) stage, wherein the circuit can perform valley-filling for an output signal generated by the PFC.

BACKGROUND

Switched mode power supplies are often used with mains driven applications having high and medium power rates in order to increase the efficiency of the application, and also to fulfil requirements regarding a necessity of nearly sinusoidal input currents to satisfy a standard, such as European standard EN 61000-3-2. Therefore, an active power factor correction (PFC) circuit is often used as a primary stage followed by a bulk capacitor that is used to smooth the output voltage and generate an output voltage that is as constant as possible (within economical justifiable limits) for subsequent DC-DC converters or loads.

The listing or discussion of a prior-published document or any background in the specification should not necessarily be taken as an acknowledgement that the document or background is part of the state of the art or is common general knowledge.

SUMMARY

According to a first aspect of the invention, there is provided a circuit comprising:
a power factor correction stage having a DC input, a ground input, a DC output and a ground output;
 a capacitor;
 a diode; and
 discharge means; wherein
a first terminal of the diode is connected to an input of the power factor correction stage, a second terminal of the diode is connected to the first plate of the capacitor, and the second plate of the capacitor is connected to the other input of the PFC stage; and
 the discharge means is connected to the capacitor and is configured to discharge the capacitor such that it contributes to the output of the PFC stage when the level of a signal at the input of the PFC stage falls below a threshold value.

It will be appreciated that the DC input of the power factor correction stage may be a rectified AC input, such as that provided by a bridge rectifier.

In some examples, the diode could be provided as part of a further bridge rectifier provided in parallel with the rectification module or as a separate discrete component. It will be appreciated that the provision of the diode does not preclude the option of further diodes also being provided, for example the provision of a second, third and fourth diode as part of a further bridge rectifier.

The first terminal of the diode may be the anode of the diode, and the second terminal of the diode may be the cathode, or vice versa. The orientation of the diode can be selected so as to provide a closed circuit for charging the capacitor from the mains supply, whereby the closed circuit includes a diode of the rectification module connected to one of the plates of the capacitor, and the diode is connected to the other plate of the capacitor.

There may be provided a circuit comprising:
a power factor correction stage having a DC input, a ground input, a DC output and a ground output;
 a capacitor;
 a diode; and
 discharge means; wherein
the anode of the diode is connected to the DC input of the power factor correction stage, the cathode of the diode is connected to the first plate of the capacitor, and the second plate of the capacitor is connected to the ground input of the PFC stage; and
 the discharge means is connected to the first plate of the capacitor and is configured to discharge the capacitor such that it contributes to the output of the PFC stage when the level of a signal at the input of the PFC stage falls below a threshold value.

There may be provided a circuit comprising:
a power factor correction stage having a DC input, a ground input, a DC output and a ground output;
 a capacitor;
 a diode; and
 discharge means; wherein
the cathode of the diode is connected to the ground input of the power factor correction stage, the anode of the diode is connected to the first plate of the capacitor, and the second plate of the capacitor is connected to the DC input of the PFC stage; and
 the discharge means is connected to the second plate of the capacitor and is configured to discharge the capacitor such that it contributes to the output of the PFC stage when the level of a signal at the input of the PFC stage falls below a threshold value.

According to a further aspect of the invention, there is provided a circuit comprising:
a rectification module having a first input, a second input, a DC output and a ground output;
a power factor correction stage having a DC input, a ground input, a DC output and a ground output;
 wherein the DC output of the rectification module is connected to the DC input of the power factor correction stage and the ground output of the rectification module is connected to the ground input of the power factor correction stage;
the circuit further comprising:
 a first diode;
 a second diode;
 a capacitor; and
 discharge means; wherein
a first terminal of the first diode is connected to the first input of the rectification module, a first terminal of the second diode is connected to the second input of the rectification module, second terminals of the first and second diodes are both connected to the first plate of the capacitor, and the second plate of the capacitor is connected to an output of the rectification module; and wherein:
 the discharge means is connected to the capacitor and is configured to discharge the capacitor such that it contributes to the output of the PFC stage when the level of a signal at the input of the PFC stage falls below a threshold value.

There may be provided a circuit comprising:
a rectification module having a first input, a second input, a DC output and a ground output;
a power factor correction stage having a DC input, a ground input, a DC output and a ground output;

wherein the DC output of the rectification module is connected to the DC input of the power factor correction stage and the ground output of the rectification module is connected to the ground input of the power factor correction stage;
the circuit further comprising:
 a first diode;
 a second diode;
 a capacitor; and
 discharge means; wherein
the anode of the first diode is connected to the first input of the rectification module, the anode of the second diode is connected to the second input of the rectification module, the cathodes of the first and second diodes are both connected to the first plate of the capacitor, and the second plate of the capacitor is connected to the ground output of the rectification module; and wherein:
 the discharge means is connected to the first plate of the capacitor and is configured to discharge the capacitor such that it contributes to the output of the PFC stage when the level of a signal at the input of the PFC stage falls below a threshold value.

There may be provided a circuit comprising:
 a rectification module having a first input, a second input, a DC output and a ground output;
 a power factor correction stage having a DC input, a ground input, a DC output and a ground output;
 wherein the DC output of the rectification module is connected to the DC input of the power factor correction stage and the ground output of the rectification module is connected to the ground input of the power factor correction stage;
the circuit further comprising:
 a first diode;
 a second diode;
 a capacitor; and
 discharge means; wherein
the cathode of the first diode is connected to the first input of the rectification module, the cathode of the second diode is connected to the second input of the rectification module, the anodes of the first and second diodes are both connected to the first plate of the capacitor, and the second plate of the capacitor is connected to the DC output of the rectification module; and wherein:
 the discharge means is connected to the second plate of the capacitor and is configured to discharge the capacitor such that it contributes to the output of the PFC stage when the level of a signal at the input of the PFC stage falls below a threshold value.

The discharge means may comprise a discharge inductor. A discharge inductor can be considered as a component that can cause the capacitor to be selectively discharged based upon the input of the PFC stage.

The discharge inductor may be coupled to a PFC inductor of the power factor correction stage. The discharge inductor and PFC inductor may have a turns ratio that is representative of the threshold level of the signal at the input of the PFC at which the discharge means is configured start contributing to the output of the PFC stage.

The discharge means may also comprise a discharge diode connected between the discharge inductor and the capacitor. The discharge diode may be configured to prevent energy from flowing from the output of the power factor correction stage to the capacitor.

The power factor correction stage may be a boost converter, a buck converter, a flyback converter, or any other converter, and in some embodiments any converter that has an inductor.

The power factor correction stage may be a flyback converter having a transformer. The discharge inductor may be provided as a second primary winding of the transformer of the flyback converter.

The second primary winding can be provided as a component that is separate and/or discrete from the primary winding of the flyback converter. In other examples, the primary winding may be provided by a tapped inductor having a first portion representative of the second primary winding/inductor of the discharge means, and a second portion representative of the primary winding of the transformer of the flyback converter.

The discharge means may comprise a switch. The circuit may comprise a controller that is configured to operate the switch. The switch may be an active switch that is operable in accordance with a signal received at an input or output of the rectification module, or a signal derived from a signal received at an input or output of the rectification module. For example, the controller may be configured to operate the switch so that it is closed for a period of time relative to a zero-crossing a signal received at an input of the rectification module. Such a signal may be a mains voltage signal. The controller may be configured to operate the switch such that it is closed for a period of time at which the input of the PFC stage falls below a threshold value, and such a period of time may correspond to a period of time either side of a zero crossing of a received AC voltage signal.

The controller may process a signal received at an input of the rectification module and/or a signal at the DC output of the rectification module and/or a signal at the DC input/output of the power factor correction stage in order to determine when the input of the PFC stage falls below a threshold value and therefore when to operate the switch.

The circuit may further comprise a charge pump diode; and a charge pump capacitor (2206). A first terminal of the charge pump diode can be connected to the diode, or first and second diodes, and a second terminal of the charge pump diode can be connected to the first plate of the capacitor. A first plate of the charge pump capacitor can be connected to the first terminal of the charge pump diode, and a second plate of the charge pump capacitor can be connected to the discharge means.

The circuit may further comprise: a charge pump inductor; a charge pump diode; and a charge pump capacitor. The charge pump inductor and the charge pump diode may be connected in series between the diode (for embodiments that have only a single additional diode), or first and second diodes (for embodiments that have two additional diodes), and the first plate of the capacitor. A first plate of the charge pump capacitor may be connected to a junction between the charge pump inductor and the charge pump diode. A second plate of the charge pump capacitor may be connected to the discharge means. For example, the charge pump capacitor may be provided in parallel across an inductor of the discharge means, such as a second primary winding of the discharge means. In this way, charge pump functionality can be provided so as to "pump" charge from a lower to a higher voltage level, so that the capacitor is not charged only for short periods of time, but within the whole mains cycle.

One end/late of the charge pump capacitor can be connected directly or indirectly (possibly with several other components and/or circuits in between) to a first pin of an inductor of the discharge means, and the other end/plate of the charge pump capacitor can be connected directly or indirectly to the other end of the inductor of the discharge means.

It will be appreciated that the charge pump can also work when the charge pump inductor value is very small, and in some embodiments even if the charge pump inductor is omitted altogether.

According to a further aspect of the invention, there is provided a method of operating a circuit, the circuit comprising:
a power factor correction stage having a DC input, a ground input, a DC output and a ground output;
a capacitor;
a diode; and
discharge means; wherein
a first terminal of the diode is connected to an input of the power factor correction stage, a second terminal of the diode is connected to the first plate of the capacitor, and the second plate of the capacitor is connected to the other input of the PFC stage; and
the discharge means is connected to the capacitor;
the method comprising:
discharging the capacitor such that it contributes to the output of the PFC stage when the level of a signal at the input of the PFC stage falls below a threshold value.

According to a further aspect of the invention, there is provided a method of operating a circuit, the circuit comprising:
a rectification module having a first input, a second input, a DC output and a ground output;
a power factor correction stage having a first input, a second input, a DC output and a ground output;
wherein the DC output of the rectification module is connected to the first input of the power factor correction stage and the ground output of the rectification module is connected to the second input of the power factor correction stage;
the circuit further comprising:
a first diode;
a second diode;
a capacitor; and
discharge means; wherein
a first terminal of the first diode is connected to the first input of the rectification module, a first terminal of the second diode is connected to the second input of the rectification module, second terminals of the first and second diodes are both connected to the first plate of the capacitor, and the second plate of the capacitor is connected to an output of the rectification module; and wherein:
the discharge means is connected to the capacitor;
the method comprising:
discharging the capacitor such that it contributes to the output of the PFC stage when the level of a signal at the input of the PFC stage falls below a threshold value.

The method may comprise determining that the level of a signal at the input of the PFC stage falls below a threshold value by identifying a period of time relative to a phase of an input signal, such as a mains voltage signal or by measuring the input/output signal of the PFC stage, as non-limiting examples.

The discharge means may comprise a switch, and the method may comprise opening and closing the switch in order to discharge the capacitor such that it contributes to the output of the PFC stage when the level of a signal at the input of the PFC stage falls below a threshold value. The method may comprise opening the switch when the level of the signal at the input of the PFC stage rises above a threshold value, and closing the switch when the level of the signal at the input of the PFC stage falls below a threshold value. The circuit may comprise a controller configured to operate the switch of the discharge means.

BRIEF DESCRIPTION OF THE DRAWINGS

A description is now given, by way of example only, with reference to the accompanying drawings, in which.

DETAILED DESCRIPTION

One or more embodiments described herein can relate to a circuit that is usable with a power factor correction (PFC) stage, whereby energy from a mains supply (either before or after rectification) can be used to charge a capacitor. The capacitor can then be discharged by a discharge means such that it contributes to the output of the PFC stage when the level of a signal at the input of the PFC stage falls below a threshold value, thereby reducing any ripple voltage in the output of the PFC stage. This may be known in the art as "valley-filling". Different examples of discharge means that can be used to provide the required functionality are described herein, and include an inductor that is inductively coupled to an inductor of the PFC stage, whereby the turns ratio between the inductors can determine when the discharge means is used to contribute to the output voltage of the PFC. Such examples may require only a single secondary side of a transformer for transferring energy to an output of the PFC stage. Other examples can include a switch, such as a low frequency switch, that is operated in order to transfer energy from the capacitor to the output of the PFC stage when the input signal of the PFC stage is "low". Such examples may not require an additional converter at the secondary side of the transformer if the remaining ripple voltage is within an acceptable limit for the application, and therefore can reduce the complexity and cost of the circuit when compared with the prior art.

Figure 1:
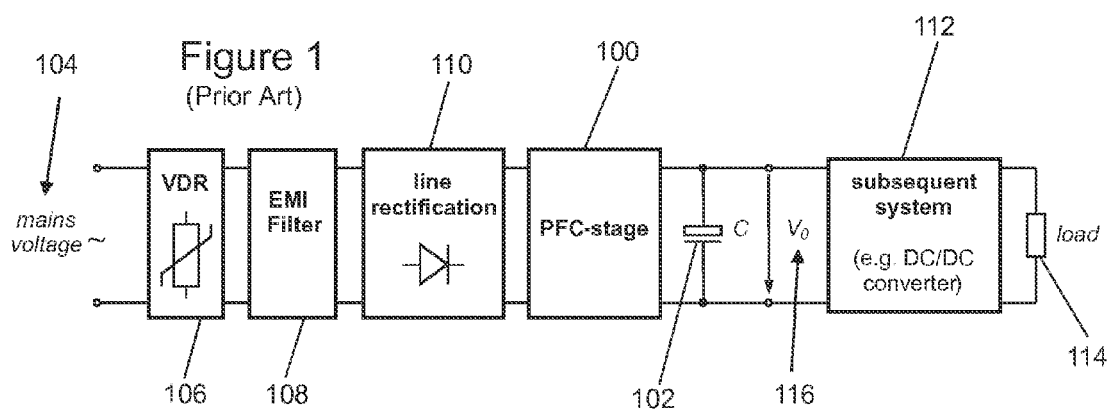
FIG. 1 illustrates a block diagram of a typical power conversion system comprising a power factor correction circuit (PFC)

FIG. 1 illustrates a block diagram of a mains driven power supply with power factor correction according to the prior art.

The mains driven power supply of FIG. 1 receives a mains voltage 104, and a voltage dependent resistor (VDR) 106 is provided across the mains voltage input terminals. The mains voltage 104 is provided to an EMI filter 108 as is known in the art (low pass filter). The output of the EMI filter 108 is provided to a line rectification module 110, such as a bridge rectifier.

The output of the line rectification module 110 is provided to a PFC stage 100. The PFC stage 100 in this example is configured as a DC-DC converter as it receives a rectified signal from the line rectification module 110 and generates an output voltage which is a DC voltage having a ripple component. An output capacitor 102 is coupled between the outputs of the PFC stage 100 in order to reduce the ripple component of the output voltage $V_O$ 116. This output voltage $V_O$ 116 can be provided to a subsequent system 112 such as a further DC/DC converter, which in turn provides an output voltage to a load 114.

Figure 2:
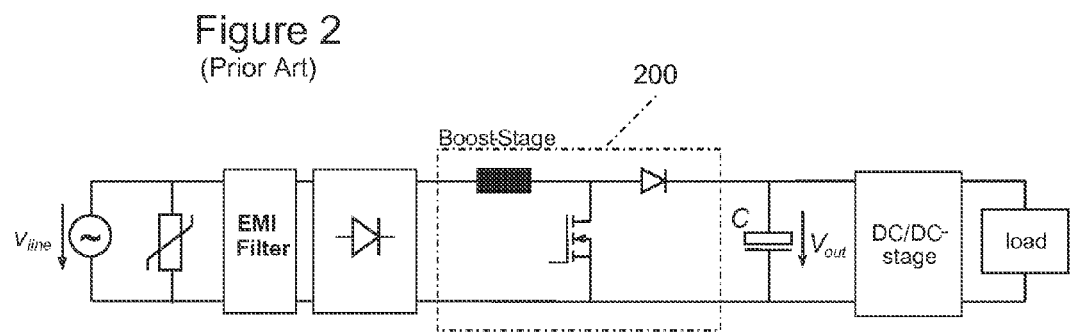
FIG. 2 illustrates a block diagram of a prior art active boost PFC stage.

FIG. 2 illustrates a prior art mains driven power supply system, that is similar to FIG. 1. In the example of FIG. 2, the PFC stage is provided by a boost converter 200.

Figure 3:
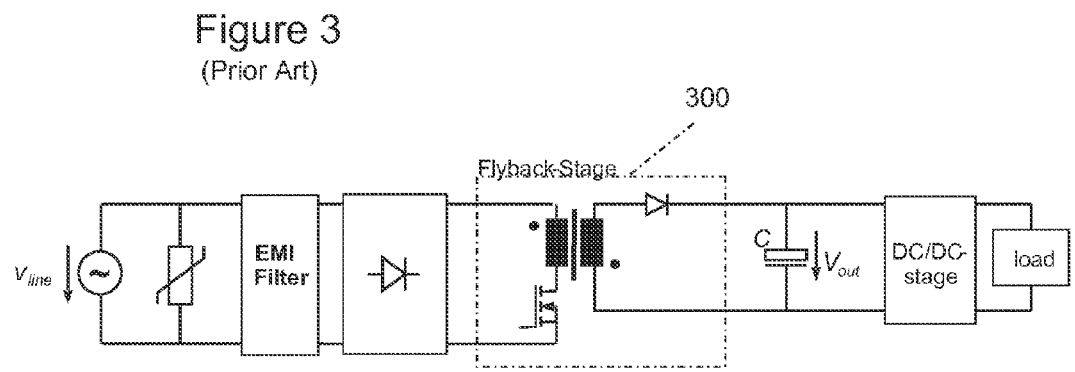
FIG. 3 illustrates a prior art isolated active flyback PFC stage.
Figure 4A:
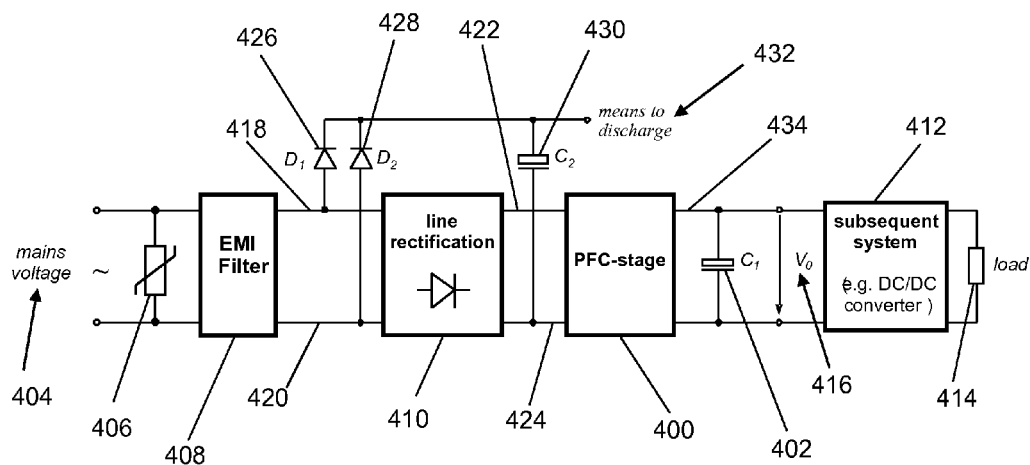
FIGS. 4a to 4d illustrate circuits according to embodiments of the invention.

FIG. 3 shows another example of a prior art mains driven power supply system, and in this example, the PFC stage is provided by a flyback converter 300. FIG. 4a illustrates a circuit according to an embodiment of the invention. It will be appreciated from the following description that one or more features of a prior art mains driven power supply system, such as the VDR 406, EMI filter 408, line rectification module 410, PFC stage 400, output capacitor 402, subsequent system 412, and load 414 may be considered as optional features of embodiments of the invention, and may be considered as non-essential for providing functionality in relation to "valley-filling" according to one or more embodiments of the invention.

The circuit comprises a first diode 426, wherein the anode of the first diode 426 is connected to a first input 418 of the line rectification module 410. The circuit also comprises a second diode 428, wherein the anode of the second diode 428 is connected to a second input 420 of the line rectification module 410. Both of the cathodes of the first and second diodes 426, 428 are connected to a first plate of a capacitor 430. The second plate of the capacitor 430 is connected to the ground output 424 of the line rectification module 410. It will be appreciated that this layout of the first diode 426, second diode 428 and the capacitor 430 causes the capacitor 430 to be charged by the mains voltage 404 via a closed circuit including either the first or second diode 426, 428 and a diode of the line rectification module 410.

The first plate of the capacitor 430 is also connected to a discharge means 432 that is configured to discharge the capacitor 430 such that it contributes to the output of the PFC stage 400 when the level of a signal at the input 422 of the PFC stage 400 falls below a threshold value. Examples of suitable discharge means 432 are provided below.

Figure 4B:
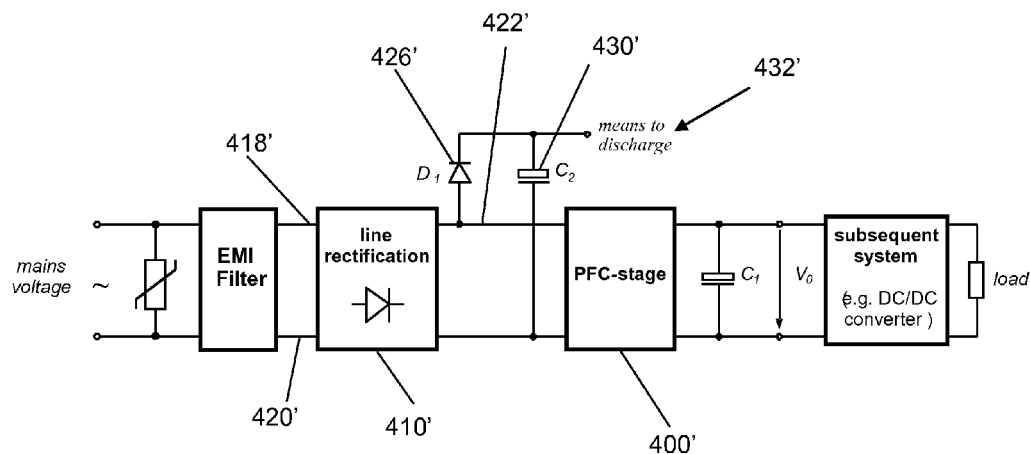

FIG. 4b illustrates a circuit according to a further embodiment of the invention. The circuit of FIG. 4b is similar to that of FIG. 4a except that only a single diode is required, because it is coupled to the output of the line rectification module 410'. The anode of the first diode 426' is connected to the DC output 422' of the line rectification module 410', and the cathode of the first diode 426' is connected to the first plate of the capacitor 430'.

It will be appreciated that only a single diode is required when the capacitor 430' is charged with energy from the output of the line rectification module 410' because the AC voltage that is received on both input terminals to the line rectification module 410', whereas the DC voltage provided at the output of the line rectification 410' is only present on the DC output 422' of the line rectification module 410'.

Figure 4C:
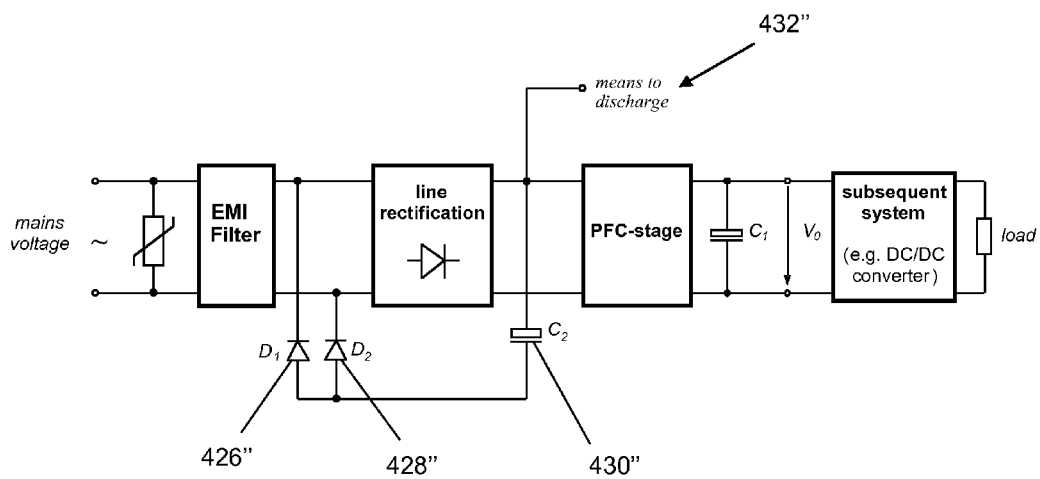

FIG. 4c illustrates a circuit according to an embodiment of the invention. In this example, the cathodes of the first and second diodes 426", 428' are connected to the two inputs to the rectification module, and the anodes of the first and second diodes 426", 428" are connected to the first plate of the capacitor 430". The second plate of the capacitor 430" is connected to the positive output of the rectification module. The discharge means 432" is connected to the second plate of the capacitor 430", which in this example is the positive plate of the capacitor during operation.

It will be appreciated that the embodiment of FIG. 4c is similar to that of FIG. 4a. The closed circuit that is provided to charge the capacitor 430" of FIG. 4c uses the additional diodes 426", 428" for providing a current path between the mains supply and the negative plate of the capacitor 430", and diodes of the rectification module for providing a current path between the mains supply and the positive plate of the capacitor 430".

In contrast, the closed circuit that is provided to charge the capacitor 430 of FIG. 4a uses the additional diodes 426, 428 for providing a current path between the mains supply and the positive plate of the capacitor 430, and diodes of the rectification module for providing a current path between the mains supply and the negative plate of the capacitor 430.

Figure 4D:
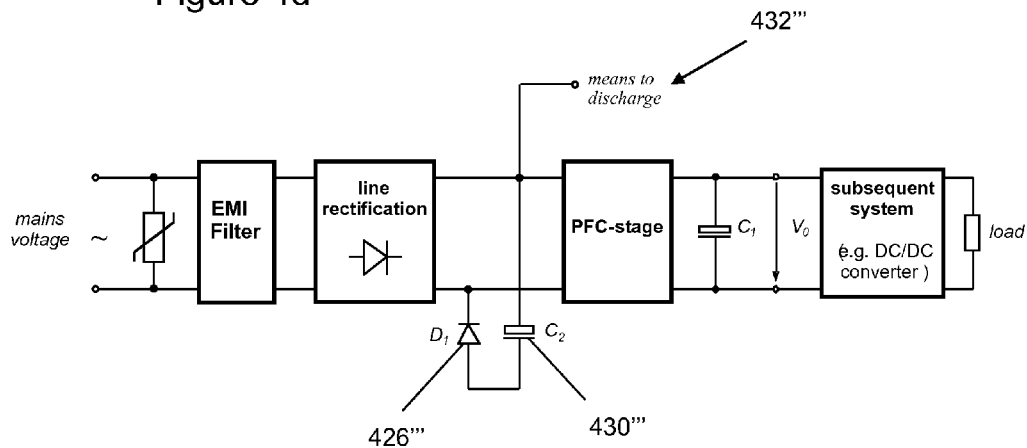

FIG. 4d illustrates a circuit according to an embodiment of the invention. In this example, the cathode of the first diode 426''' is connected to the negative output of the rectification module, and the anode of the first diode 426''' is connected to the first plate of the capacitor 430'''. The second plate of the capacitor 430''' is connected to the positive output of the rectification module. The discharge means 432''' is connected to the second plate of the capacitor 430''', which in this example is the positive plate of the capacitor during operation.

It will be appreciated that the embodiment of FIG. 4d is similar to that of FIG. 4b. The closed circuit that is provided to charge the capacitor 430''' of FIG. 4d uses the additional diode 426''' for providing a current path between the mains supply and the negative plate of the capacitor 430''', and a diode of the rectification module for providing a current path between the mains supply and the positive plate of the capacitor 430".

In contrast, the closed circuit that is provided to charge the capacitor 430' of FIG. 4b uses the additional diode 426' for providing a current path between the mains supply and the positive plate of the capacitor 430', and a diode of the rectification module for providing a current path between the mains supply and the negative plate of the capacitor 430'.

Examples of discharge means according to embodiments of the invention are described below. It will be appreciated that embodiments of the discharge means that are described with reference to a circuit having the structure of FIG. 4a are equally applicable to circuits having the structure of any of FIG. 4b, 4c or 4d.

FIGS. 5 to 12 illustrate examples of discharge means that can be used with embodiments of the invention. In the examples of FIGS. 5 to 12, the energy stored in the capacitor can be transferred to the output of the PFC stage by incorporating the energy to the switching action of the PFC stage, for example by providing a discharge means having an additional winding that is coupled to an inductor of the PFC switch. During normal operation, the capacitor will be charged up to the maximum input voltage, and the turns ratio of coupled inductors can determine the point at which energy stored in the capacitor start to be transferred to the output of the PFC.

FIGS. 13 to 18 illustrate further examples of discharge means that can be used with embodiments of the invention, such discharge means including an active switch that can be operated to transfer energy form the capacitor to the output of the PFC at appropriate time intervals.

Such embodiments of the invention can perform "valley-filling", thereby providing a smaller output voltage ripple. In addition, a reduction in the maximum instantaneous power level that needs to be transferred by the PFC stage can be achieved, and therefore a more efficient power supply can be provided. In contrast to prior art circuits that are used for valley-filling, embodiments of the invention can require fewer components, whilst providing more flexibility in attuning the valley-filling action by enabling adaptation of the turns ratio.

Figure 5:
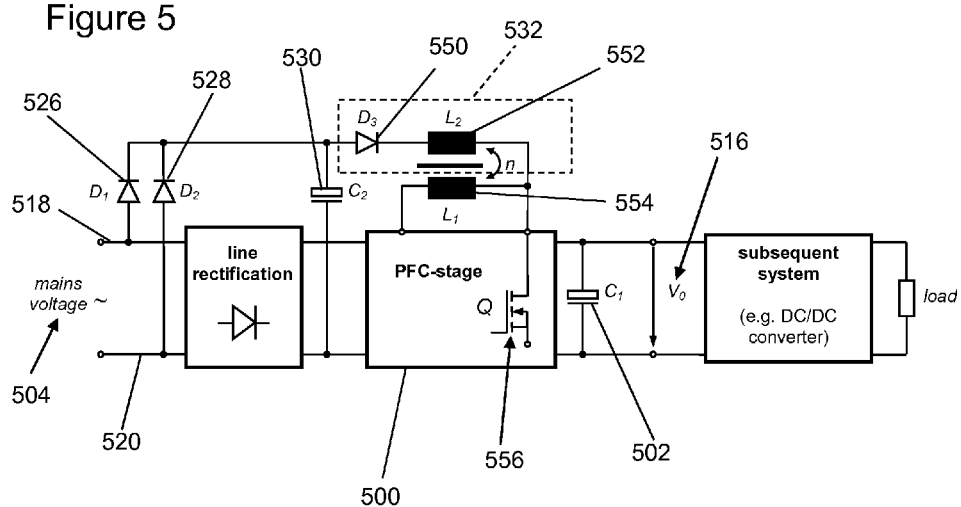
FIGS. 5 to 12 illustrate circuits having a discharge means comprising a coupled inductor according to embodiments of the invention.

FIG. 5 illustrates a circuit according to an embodiment of the invention wherein the discharge means 532 includes a third diode 550, and an inductor 552. The anode of the third diode 550 is connected to the first plate of the capacitor 530. The cathode of the third diode 550 is connected to a first terminal of the additional inductor 552, and the second terminal of the additional inductor 552 is connected to the PFC stage 500 at a junction between a PFC inductor 554 and the PFC switch 556.

The additional inductor 552 of the discharge means 532 is coupled to the PFC inductor 554 as shown in FIG. 5. The third diode 550 is provided to prevent current flowing from the output of the PFC stage 500 back to the capacitor 530.

The turns ratio between the additional inductor 552 and the PFC inductor 554 is selected such that energy starts to be transferred from the capacitor 530 to the output of the PFC stage 500 at an appropriate voltage level. That is, the turns ratio n can be selected such that energy starts to be transferred from the additional inductor 552 to the PFC inductor 554 when the input voltage of the PFC stage 500 drops below a threshold value. It will be appreciated that energy cannot be transferred from the PFC inductor 554 to the additional inductor 552, and back to the capacitor 530 due to the third diode 550.

In this way, it is possible to transfer energy from the capacitor 530 during the valleys of the rectified sinusoidal input voltage of the PFC, and consequently provide a reduction in the level of the maximum absorbed power and the ripple of the output voltage $V_O$ 516 of the PFC stage 500.

Figure 6:
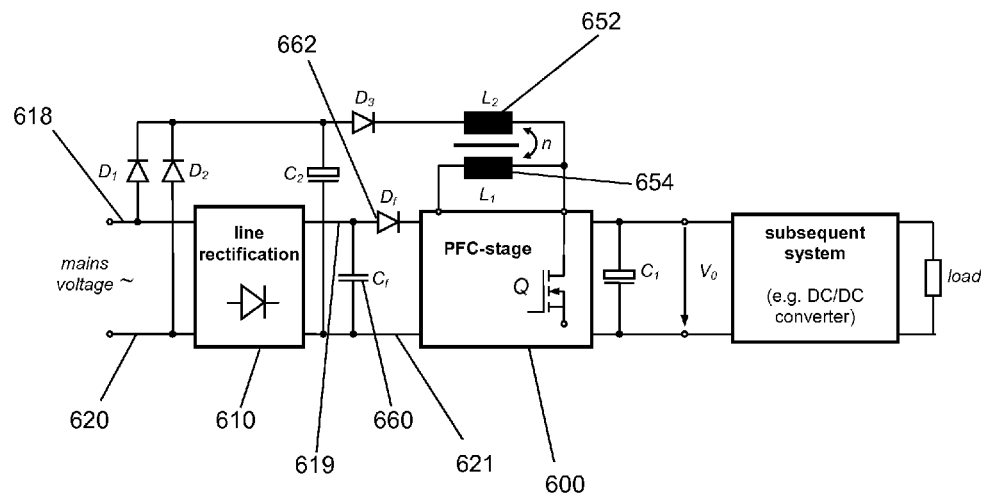

FIG. 6 illustrates a circuit according to a further embodiment of the invention. The circuit of FIG. 6 is similar to that of FIG. 5, and the functionality of corresponding components will not be described in relation to FIG. 6.

The circuit of FIG. 6 includes a filter capacitor 660 between the two outputs 619, 621 of the line rectification module 610. Such a filter capacitor 660 is well known in the art.

In this embodiment, a fast rectifier filter diode 662 is connected between the DC input of the PFC stage 600 and the filter capacitor 660. In this embodiment, the DC input of the power factor correction stage receives a rectified AC input, as provided by the line rectification module 610. The fast rectifier diode 662 prevents high currents that would be caused by charging and discharging the filter capacitor 660 due to the switching action of the coupled inductors 652, 654.

In further embodiments still, the filter capacitor 660 may be provided between the inputs 618, 620 of the line rectification module 610 instead of between the outputs 619, 621. In this way, the voltage swings caused by the filter capacitor 660 can be removed, and the additional fast rectifier diode 662 between the line rectification module 610 and the PFC stage 600 may not be required as fast rectifier diodes may be available as part of the line rectification module 610.

It will be appreciated from the description that follows, that other embodiments described herein can generate a voltage swing due to coupled inductors, and that the filter capacitor 660 and/or fast rectifier diode 662 can also be used with other embodiments in order to reduce or prevent large currents due to voltage swings caused by the switching action of coupled inductors.

Figure 7:
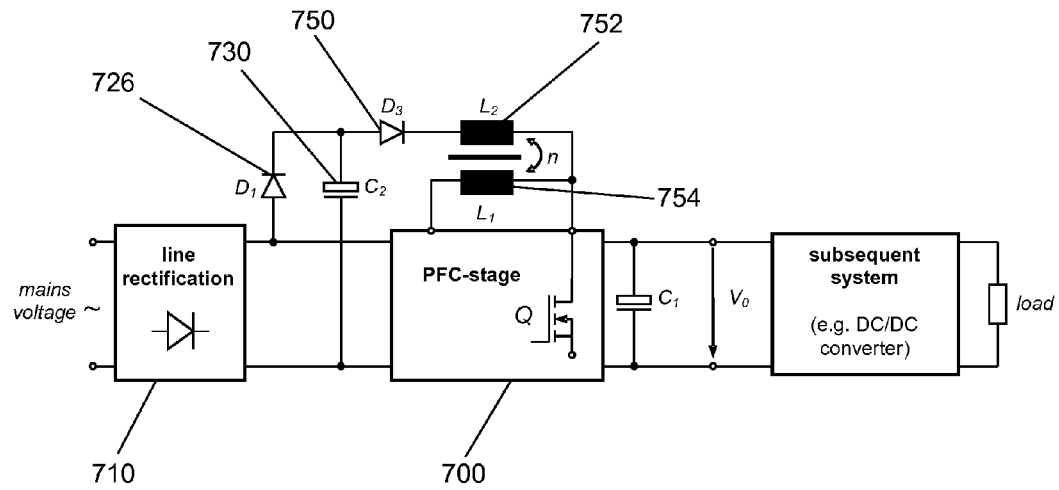

FIG. 7 illustrates a circuit according to an embodiment of the invention, wherein the discharge means comprises a third diode 750 and an additional inductor 752 which is coupled to an inductor 754 of the PFC stage 700. The embodiment of FIG. 7 differs to that of FIG. 5 in as much as the capacitor 730 is charged by voltage from the DC output of the line rectification module 710 as opposed to voltage from the input of the line rectification module 710. Therefore, only a single additional diode 726 is required to provide a circuit to charge the capacitor 730. A DC voltage is used to charge the capacitor 730 of FIG. 7, as opposed to the AC voltage that is used for FIG. 5.

Figure 8:
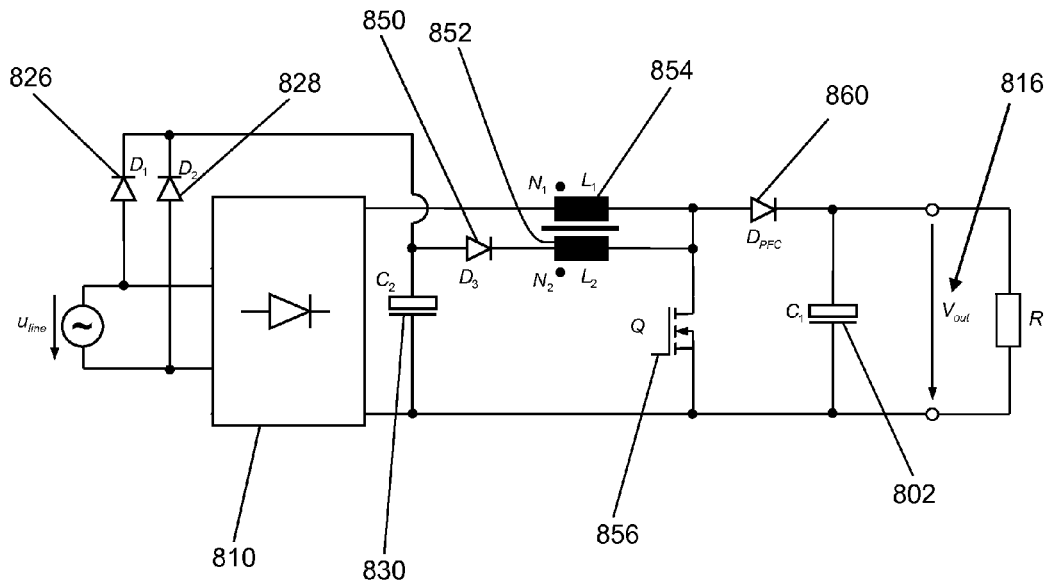

FIG. 8 illustrates a circuit according to another embodiment of the invention, wherein the power factor correction stage is a boost converter.

The boost converter comprises a first inductor 854, a switch 856, a switching diode 860 and an output capacitor 802, as is known in the art.

The circuit of FIG. 8 also includes a first diode 826 connected between a first mains input terminal and a first plate of an additional capacitor 830, and a second diode 828 connected between a second mains terminal and the first plate of the capacitor 830. The second plate of the capacitor 830 is connected to the ground output terminal of the bridge rectifier 810. In this way, the mains voltage can be used to charge the additional capacitor 830 via the first and second diodes 826, 828 and diodes within the bridge rectifier 810.

Also connected to the first plate of the additional capacitor 830 is the anode of a third diode 850. The cathode of the third diode 850 is connected to a first terminal of a further inductor 852, and the second terminal of the further inductor 852 is connected to a junction between the PFC inductor 854, the PFC switch 856 and the switching diode 860.

The additional inductor 852 is coupled to the PFC inductor 854, and therefore to the converter stage, in order to release energy stored in the additional capacitor 830. The coupled inductor turns ratio is determined by $n=N_1/N_2$, where $N_1$ is the number of turns of the PFC inductor 854, and $N_2$ is a number of turns of the additional inductor 852. The turns ratio is chosen so that the additional capacitor 830 is discharged starting at a time close to the zero crossing of the line input voltage, so that the output of the boost converter is supplemented by the charge of the additional capacitor 830.

Figure 9:
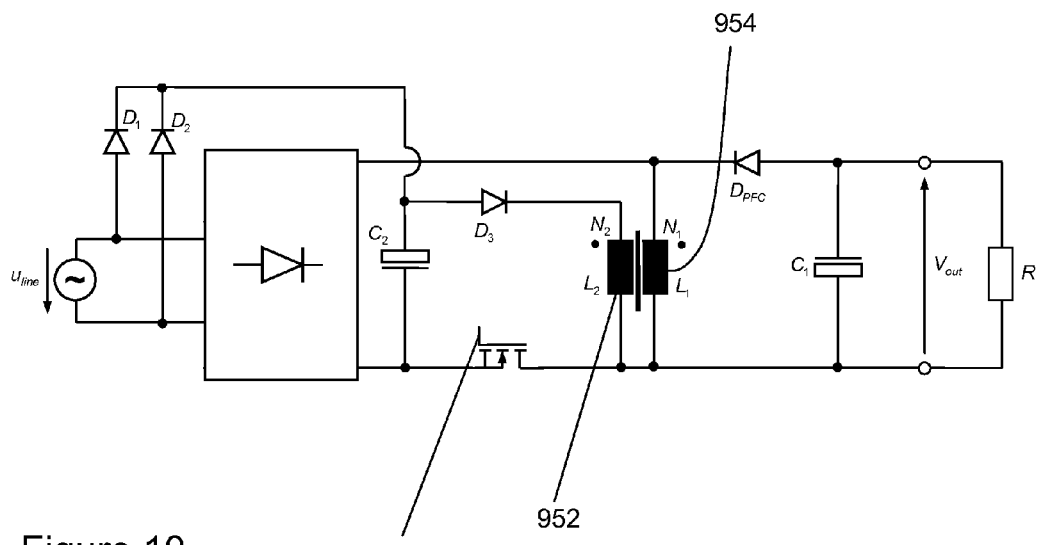

FIG. 9 illustrates a further embodiment of the invention. The PFC shown in FIG. 9 is a buck-boost converter provided with a low side switch 956. The additional inductor 952 is coupled to the inductor 954 of the buck-boost converter in the same way that the additional inductor 852 is coupled to the inductor 854 of the boost converter shown in FIG. 8.

Figure 10:
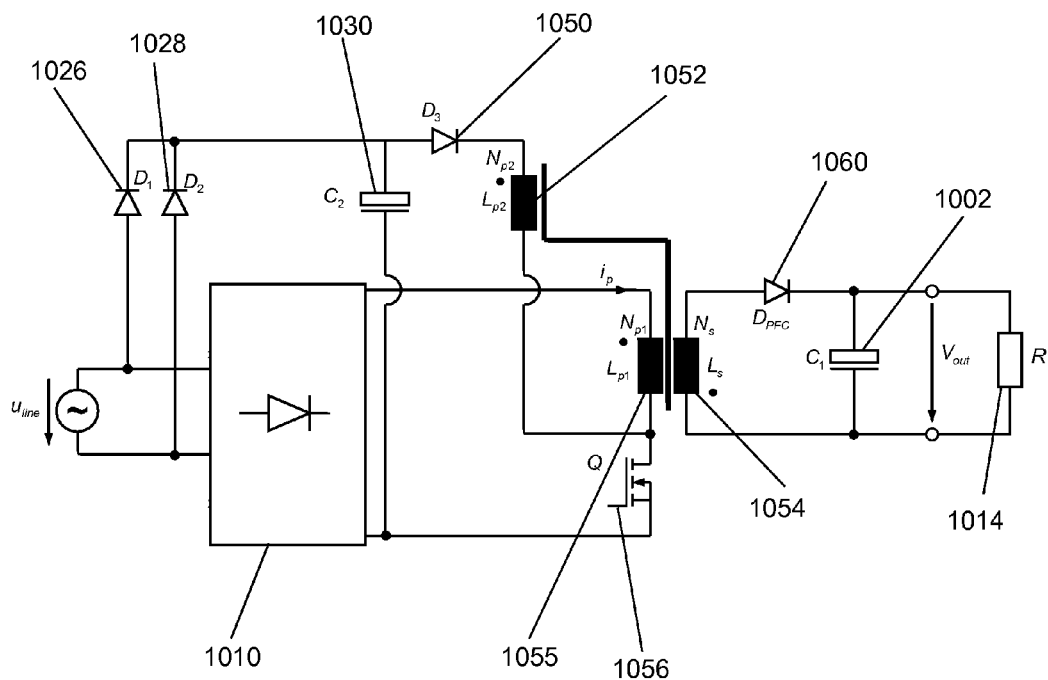

FIG. 10 illustrates a further embodiment of the invention, which utilises a flyback converter. Such a flyback converter provides an isolation stage that may be advantageous in some situations.

The known flyback converter stage of FIG. 10 consists of coupled inductors $L_{p1}$ 1055 and $L_s$ 1054, the switching element 1056, a PFC diode 1060, and an output capacitor $C_1$ 1002.

The circuit according to this embodiment of the invention also includes a third inductor $L_{p2}$ 1052 that is coupled to the same core as the inductors $L_{p1}$ and $L_s$ 1055, 1054 of the flyback converter. The third inductor $L_{p2}$ is provided as an additional primary winding of the transformer provided by the coupled inductors $L_{p1}$ and $L_s$ 1055, 1054. As described above, the additional capacitor $C_2$ 1030 is charged by the additional diodes $D_1$ 1026 and $D_2$ 1028.

The starting point for transferring energy from the additional capacitor $C_2$ 1030 to the output capacitor $C_1$ 1002 in relation to the line input voltage is determined by the turns ratio $n=N_{p1}/N_{p2}$.

Figure 11:
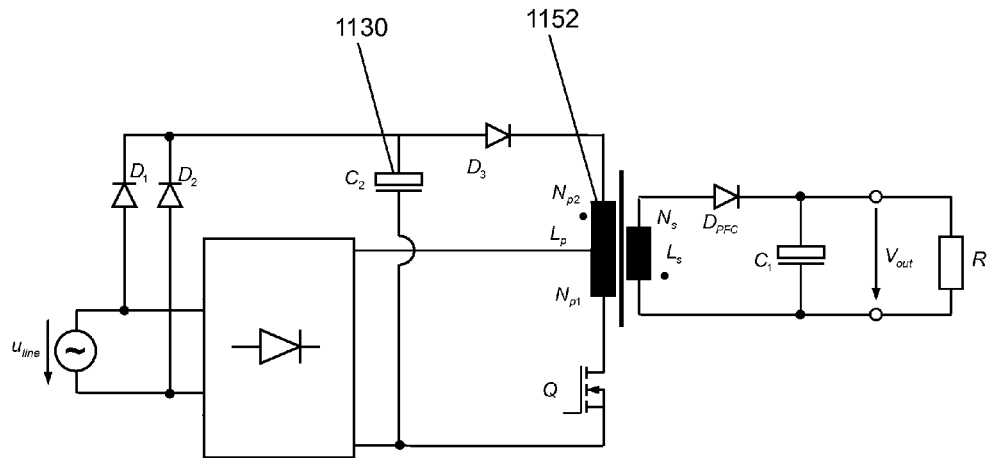

FIG. 11 shows an embodiment of the invention that is similar to FIG. 10 whereby a tapped inductor 1152 is used as the primary side of the transformer of the flyback converter instead of the additional inductor/winding 1052 shown in FIG. 10.

The operating point at which energy is transferred from the additional capacitor $C_2$ 1130 is determined by the turns ratio:

$$n=N_{p1}/(N_{p1}+N_{p2})$$

Figure 12:
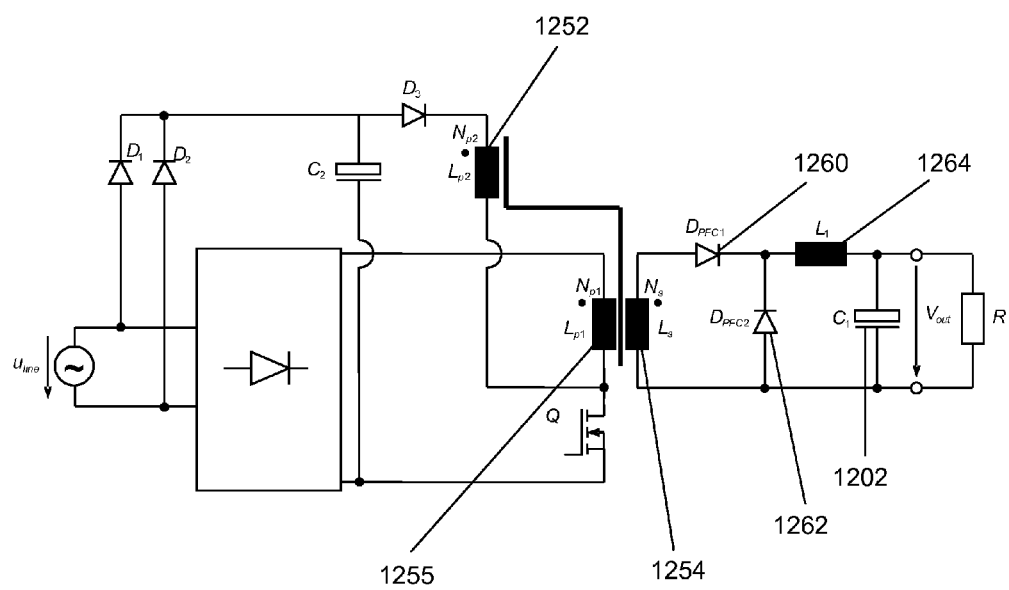

An alternative embodiment of the invention that uses a forward converter is shown as FIG. 12. Components of FIG. 12 that are common to FIG. 10 will not be described in detail again here.

FIG. 12 shows a PFC-forward stage that has been modified according to an embodiment of the invention. It will be appreciated that for ease of illustration, the demagnetising means, such as a third winding on the primary side of the transformer, is not shown in FIG. 12.

The circuit of FIG. 12 includes a second PFC diode 1262 connected between the outputs of the forward converter, and a further inductor $L_1$ 1264 connected between the anodes of the first and second PFC diodes 1260, 1262 and the output capacitor 1202. In this embodiment, only negligible energy is stored in the coupled inductors $L_{p1}$ 1255, $L_{p2}$ 1252, and $L_s$ 1254, and therefore they can be considered as an implementation of a real transformer.

Further embodiments of the present invention include a discharge means that includes an additional switch in order to activate the energy transfer to the output capacitor by an additional control algorithm. This can allow for a starting point at which energy is transferred from the additional capacitor to the output of the PFC to be set in accordance with specific requirements, such as high and low mains in a worldwide PFC design.

Figure 13:
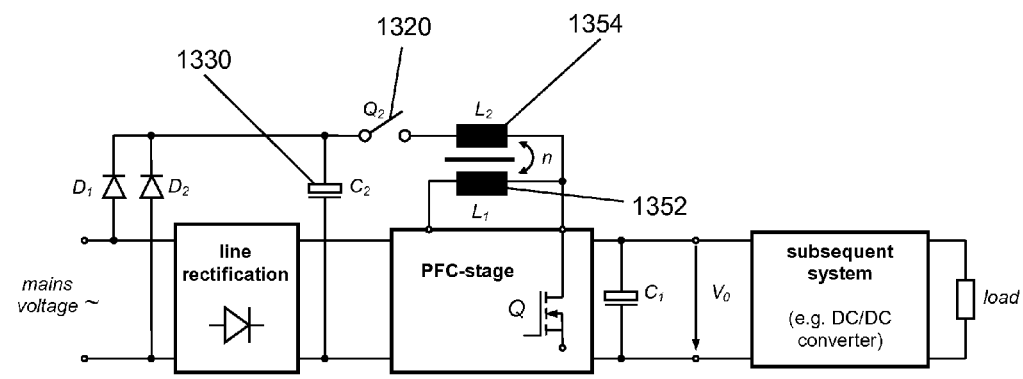
FIGS. 13 to 15 illustrate circuits having a discharge means comprising a switch according to embodiments of the invention.

FIG. 13 illustrates an embodiment of the invention that utilises an additional switch $Q_2$ 1320. The additional switch $Q_2$ 1320 is connected between the first plate of the additional capacitor $C_2$ 1330 and the additional inductor 1354. In this example, the additional inductor 1354 is coupled to an inductor 1352 of the PFC stage in a similar way to that illustrated in FIG. 5. In such examples, the further diode 550 illustrated in FIG. 5 may not be required as the operation of the additional switch $Q_2$ 1320 may be open during periods of time at which energy would otherwise be transferred from the output of the PFC stage back to the additional capacitor 1330.

It will be appreciated, that in other embodiments the additional inductor 1354 need not necessarily be coupled to the inductor 1352 of the PFC stage.

The additional switch $Q_2$ 1320 can be operated by a controller (not shown). The controller may implement a control algorithm to operate the additional switch $Q_2$ 1320 such that the capacitor 1330 is discharged to the output of the PFC stage when the level of a signal at the input of the PFC stage falls below a threshold value. The controller can determine that the input of the PFC stage is below a threshold value by directly measuring the input of the PFC stage. In other examples, the controller can process the signals received at the input of the PFC stage and/or the input of the line rectification module in order to determine when the capacitor 1330 should be discharged.

An example of a control algorithm that can be used to operate the additional switch $Q_2$ 1320 can cause the additional switch $Q_2$ 1320 to be closed for a short period of time either side of a zero crossing of the main supply voltage. This can be based on the fact that the minimum value of the input voltage of the switched mode power supply will be either side of the zero crossing of the original mains voltage signal. The timing at which the additional switch $Q_2$ 1320 is closed relative to the phase of the mains signal can be representative of a threshold voltage of the input signal of the switch mode power supply at which the additional capacitor 1330 contributes to the output. An example of "a short period of time either side of a zero crossing of the main supply voltage" is of the order of a few milliseconds. In some embodiments the switch $Q_2$ can be turned on for the complete duration of a mains dip, for one or two mains half cycles for example, in order to provide energy to the output of the PFC stage.

Figure 14:
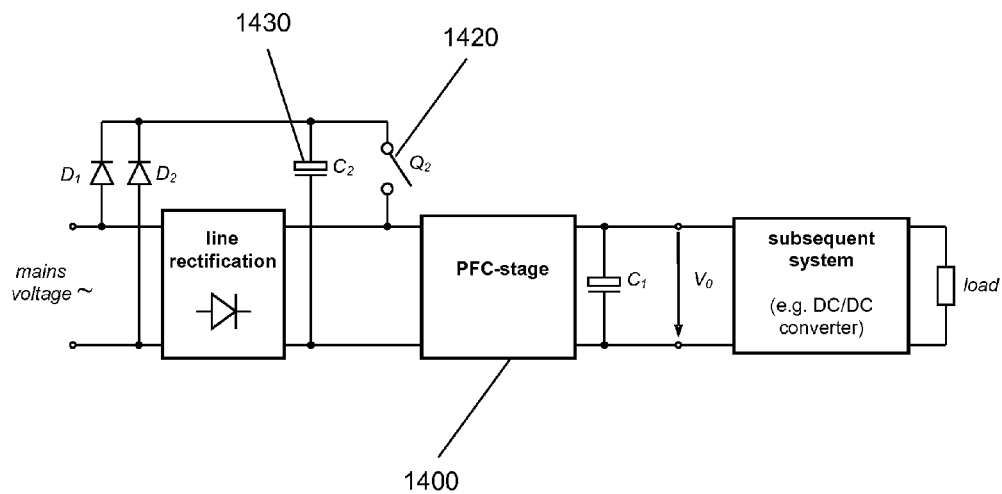

A further embodiment of a circuit according to the invention is shown as FIG. 14. In this example, the coupled inductors shown in FIG. 13 are not required, and the additional switch $Q_2$ 1420 is used to directly provide energy that has been stored in the additional capacitor 1430 to the input of the PFC stage 1400. The additional switch $Q_2$ 1420 in this example is an actively controlled switch.

Figure 15:
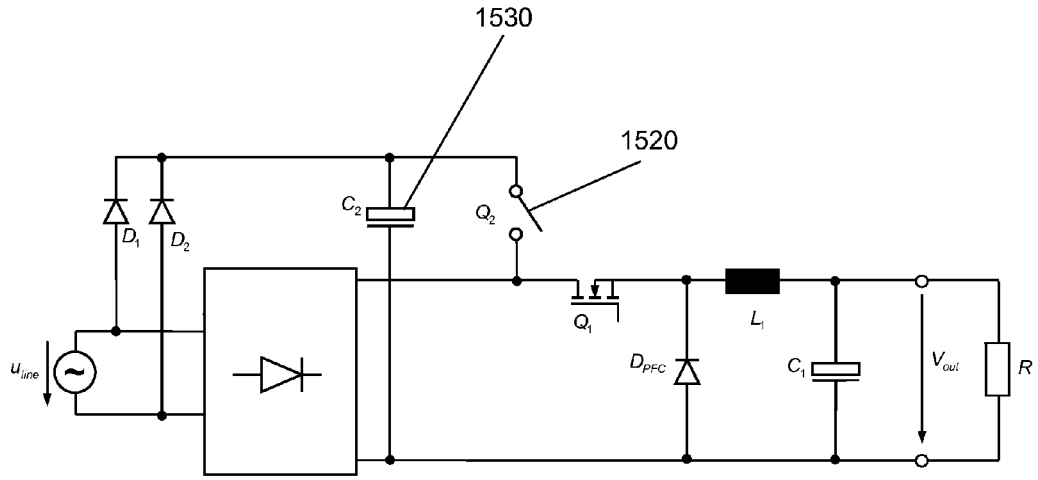

FIG. 15 illustrates a further embodiment of the invention, in which an additional switch $Q_2$ 1520 is used to transfer energy from the additional capacitor 1530 to the input of a buck converter PFC stage.

One or more embodiments described herein that utilise an actively controlled switch, such as the additional switches illustrated in FIGS. 13, 14 and 15 can provide better user control of when the energy stored in the additional capacitor is transferred to the output of the PFC, and can possibly avoid the need for an additional converter at the secondary side of the transformer if the remaining ripple voltage is within an acceptable limit for the application, or an additional auxiliary winding.

The additional switch can be considered as a low frequency switch as it needs to be turned on and off once per half cycle of the mains voltage supply.

Figure 16:
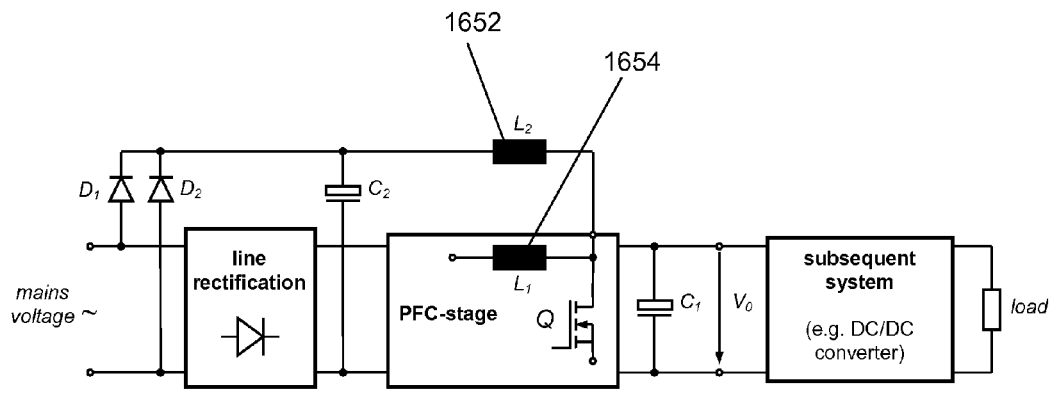
FIGS. 16 to 18 illustrate circuits having a discharge means comprising an inductor according to embodiments of the invention.

According to some embodiments of the invention, an additional inductor need not necessarily be coupled to an existing inductor of a PFC, and such embodiments may include boost convertor topologies. FIG. 16 illustrates an embodiment of the invention where the additional inductor $L_2$ 1652 is not coupled to an inductor $L_1$ 1654 of the PFC stage. The embodiment of FIG. 16, is similar to that of FIG. 5, without the two inductors being coupled together.

According to some embodiments of the invention, the use of a buck convertor as the PFC stage may require an additional switch. The additional switch may be required in order to incorporate the energy stored in the additional capacitor to the switching action of the PFC.

Figure 17:
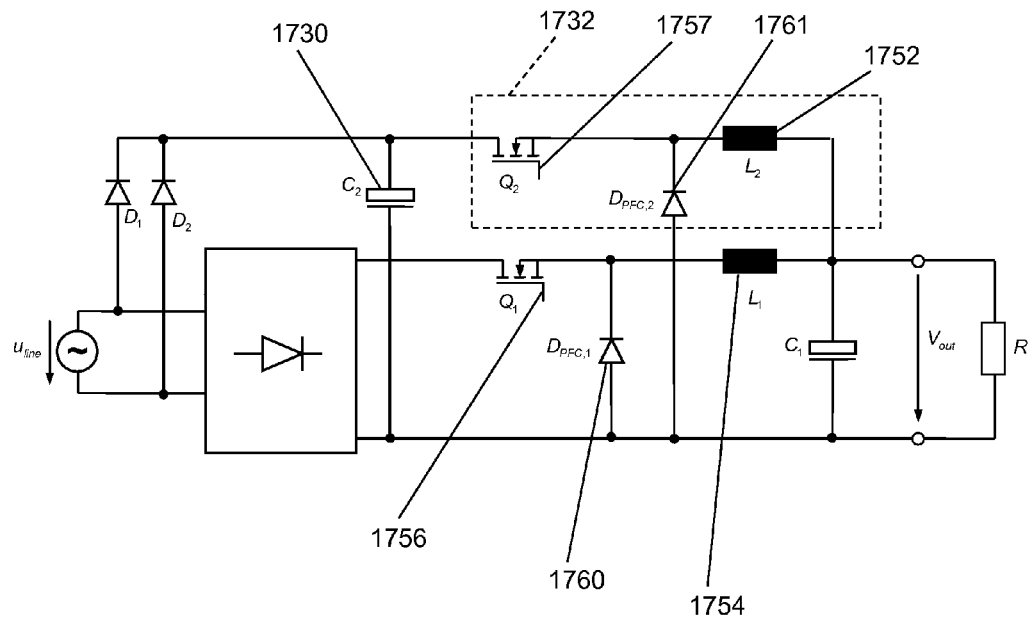

FIG. 17 illustrates an embodiment of the invention where the PFC stage comprises a buck convertor. As known in the art, the buck convertor comprises a switch $Q_1$ 1756, diode $D_{PFC,1}$ 1760 and an inductor $L_1$ 1754. According to this embodiment of the invention, the discharge means 1732 comprises an additional switch 1757, which in this example is a MOSFET $Q_2$ 1757 connected between the first plate of the additional capacitor $C_2$ 1730 and the first terminal of an additional inductor $L_2$ 1752. The second terminal of the additional inductor $L_2$ 1752 is connected to the output of the PFC stage. The discharge means 1732 also comprises an additional diode $D_{PFC,2}$ 1761 wherein the cathode of the additional diode 1761 is connected to the junction between the additional switch $Q_2$ 1757 and the additional inductor $L_2$, 1752 and the cathode of the additional diode 1761 is connected to the negative output of the PFC stage.

Figure 18:
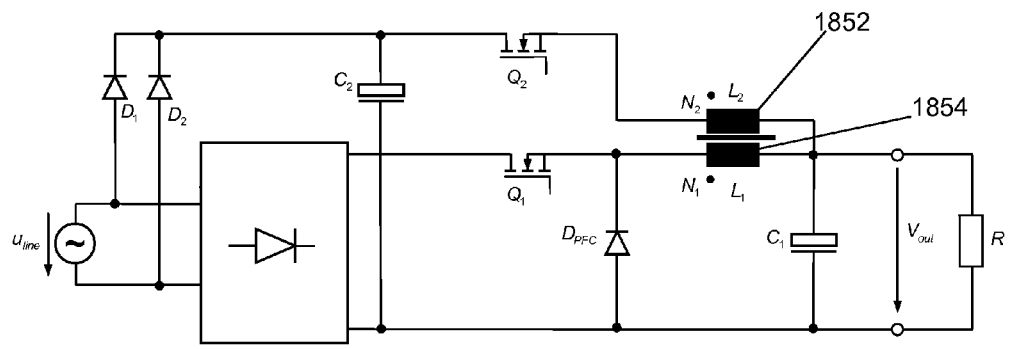

FIG. 18 illustrates a further embodiment of the invention that is similar to the embodiment of FIG. 17. In the embodiment of FIG. 18, the additional inductor $L_2$ 1852 is coupled to the inductor $L_1$ of the buck-convertor, and this may be considered as providing a common free-wheeling path of the inductor current as the two inductors $L_2$ 1852 and $L_1$ 1854 are coupled. The embodiment of FIG. 18, can avoid the need for an additional diode ($D_{PFC,2}$ shown in FIG. 17).

It will be appreciated that the embodiments of the invention described herein can be applied to other switched mode power supply topologies including, but not limited to, a half-bridge convertor, a full-bridge convertor, a Cuk convertor and a Sepik convertor.

Figure 19:
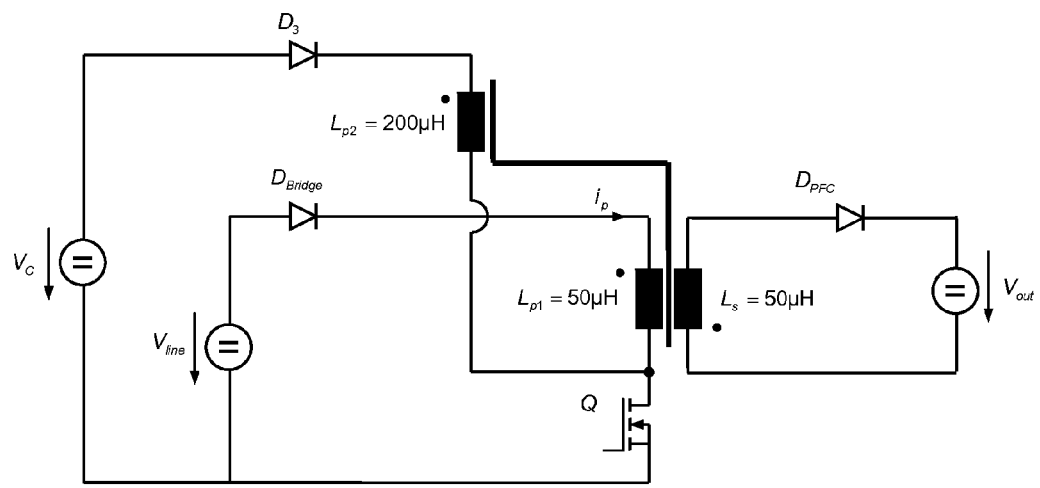
FIG. 19 illustrates schematically a circuit of an embodiment of the invention.

The functionality of an embodiment of the present invention, and the transfer of the energy to the output capacitor, will be described and illustrated with reference to the circuit of FIG. 19, and the graphical results shown as FIGS. 20 and 21. The circuit diagram of FIG. 19 represents the topology of FIG. 10 having a flyback-converter as PFC stage.

For ease of illustration and understanding of the performance of the circuit at different operational points, the sinusoidal input voltage source is replaced by a DC source $V_{line}$. For this reason, the diode bridge rectifier of FIG. 10 can be replaced by a single diode $D_{Bridge}$ in FIG. 19. Furthermore the additional capacitor $C_2$ 1030, as well as the output capacitor $C_1$ 1002, can be assumed to have a very large value, and therefore can be replaced by voltage sources $V_C$ and $V_{out}$ for the circuit shown in FIG. 19. Using the embodiment shown in FIG. 19 the working principle is explained with reference to FIGS. 20 and 21, which show two possible situations. In FIG. 20, energy is taken only from the line via $D_{Bridge}$, while in the simulated situation of FIG. 21 energy is only taken from the capacitor $C_2$ via $D_3$.

The actual flyback-stage is furthermore formed by the coupled inductors $L_{p1}$ and $L_s$, the switch Q and the diode D3. The stored energy of the additional capacitor is coupled to the flyback-stage via the additional winding $L_{p2}$. To prevent current flowing back to the additional capacitor $V_C$, the diode $D_3$ is used. The turns ratio of $L_{p1}$ and $L_{p2}$ is chosen to n=$N_{p1}$/$N_{p2}$=1/2 in this example, and as a consequence the additional capacitor $V_C$ will provide energy to the flyback-stage starting at approximately the half of the peak line voltage value. It will be appreciated that in other embodiments a different value for n can be used so that energy is transferred to the flyback stage starting at a different voltage value relative to the peak line voltage.

Figure 20:
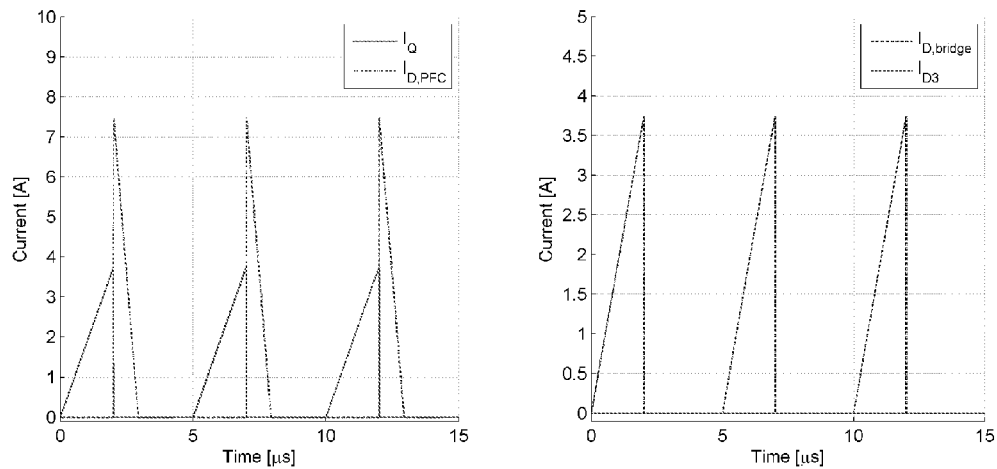
FIGS. 20 and 21 illustrate graphically the results of a simulation performed on the circuit of FIG. 19.

The graphs of FIG. 20 show current waveforms of the three diodes and the switch during a first simulation. In this simulation, the circuit is operating at peak input voltage, that is with both $V_C$ and $V_{line}$ at 375V. The output voltage $V_{out}$ is at 400V.

Figure 21:
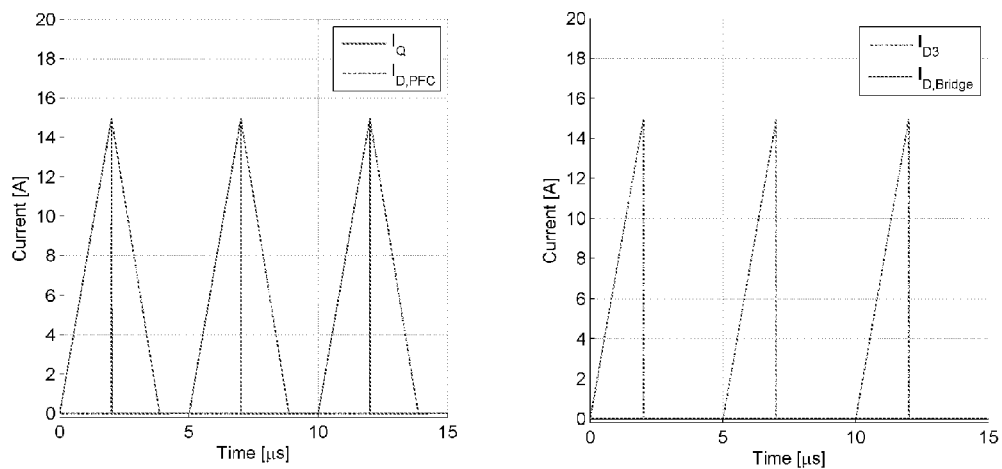

A second simulation is shown as FIG. 21, and illustrates the performance of the circuit of FIG. 19 at a line voltage that is lower than half the peak voltage and a peak capacitor voltage. In this example, $V_{line}$=150V and $V_C$=375V. The output voltage $V_{out}$ is again at 400V.

For the second simulation, it can be seen that only the current through $D_3$ flows through the switch Q, and therefore the load of the flyback converter is provided by energy from the additional capacitor $V_C$.

Figure 22:
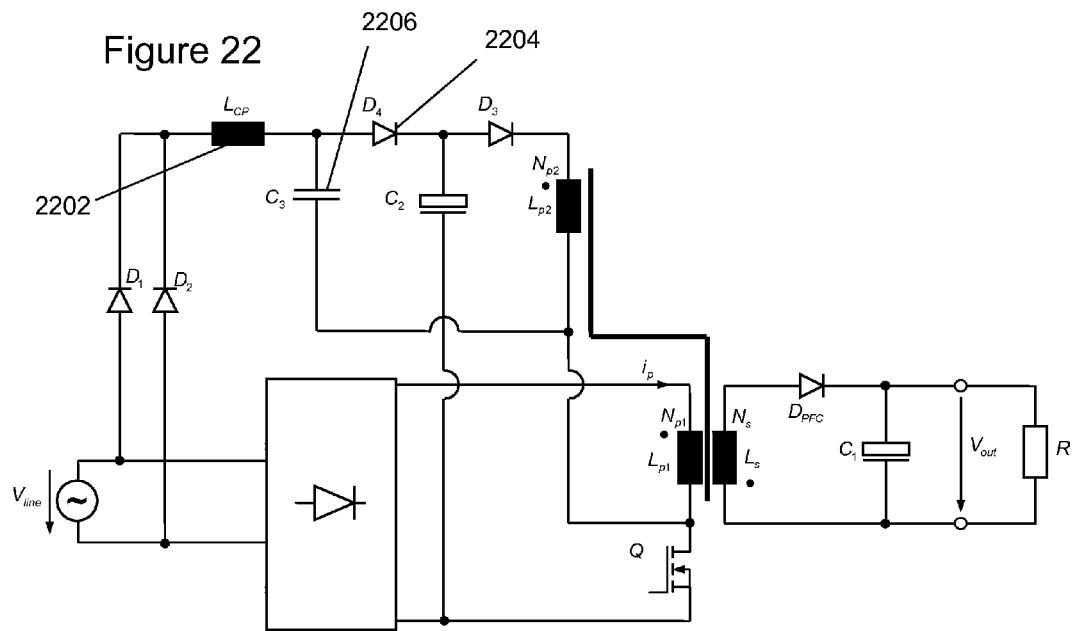
FIG. 22 illustrates a circuit having a discharge means according to an embodiment of the invention.

A further embodiment of the invention is shown in FIG. 22. The circuit consists of the combination of two different PFC approaches. First, the above-described prior art PFC-flyback-stage, which consists of a bridge rectifier, coupled inductors $L_{p1}$ and $L_s$, switch Q and diode $D_{PFC}$. A second PFC-stage consisting of a charge-pump PFC approach is formed by $L_{CP}$ 2202, $C_2$, $C_3$ 2206 and $D_4$ 2204. According to this embodiment, the discharge means of the capacitor $C_2$ consists of an additional diode $D_3$, and an additional inductor $L_{p2}$, which is also coupled to $L_{p1}$ and $L_s$ in the same way as described above. Thus, the energy stored in $C_2$ can be transferred to the output in the same way as described above in relation to other embodiments. In contrast to the above described embodiments, a further additional inductor $L_{CP}$ 2202, capacitor $C_3$ 2206 and diode $D_4$ 2204 are employed for PFC operation. These components may be referred to as charge pump components. In the previous embodiments, the capacitor $C_2$ is only charged via $D_1$ or $D_2$ in case that the line input voltage $V_{line}$ is greater than the voltage on $C_2$, which corresponds to only for a short period of time near the positive and negative peaks of the line voltage. Taking energy from the mains only for short periods of time can implicate steep and narrow current pulses. The additional capacitor $C_3$, which can have a much smaller capacitance than $C_2$, can be used to "pump" charge from a lower to a higher voltage level, so that the capacitor $C_2$ is not charged only for short periods of time, but within the whole mains cycle.

In some embodiments, the charge pump inductor $L_{CP}$ 2202 can be omitted, whilst still enabling the circuit to perform charge pump functionality.

Figure 23:
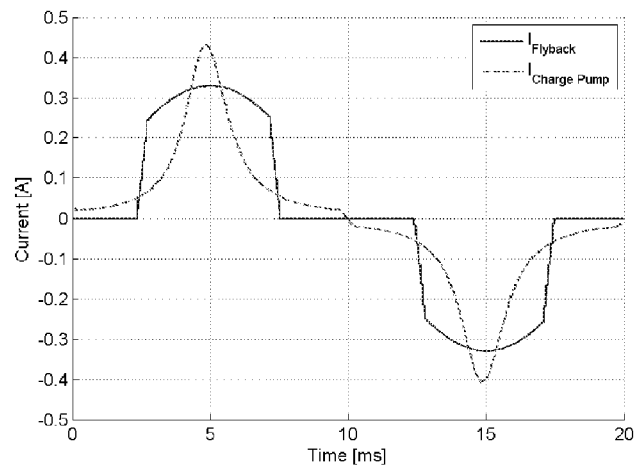
FIG. 23 illustrates graphically the results of a simulation performed on the circuit of FIG. 22.

The functionality of the PFC-operation will be described and illustrated with reference to the test circuit according to the schematic of FIG. 22, and the graphical results shown in FIG. 23. The example circuit is driven at European mains (230V, 50 Hz). The circuit only shows the fundamental functionality, thus the chosen component values are far from optimum. Furthermore, the switch Q is only driven with constant on-time throughout the mains cycle. From FIG. 23 it can be seen that the flyback stage only transfers energy to the output during high input voltages. In case of low input voltage, the energy, stored in capacitor $C_2$, delivers the energy to be transferred to the output. However, the capacitor $C_2$ is now charged during the whole mains cycle.

It will be appreciated that one or more embodiments described herein can be used with any mains driven application. One or more embodiments can reduce stress experienced by one or more components and/or can increase the efficiency of the PFC stage itself, as well as subsequent power stages.

Embodiments of the invention can be used with power supplies for LCD televisions, monitors, etc., and a specific application of the invention can be in an LCD television with LED backlights, where a mains-isolated PFC stage is required.

The invention claimed is:

1. A circuit comprising:
a power factor correction stage having a DC input, a ground input, a DC output and a ground output;
a capacitor;
a diode; and
discharge means; wherein
a first terminal of the diode connected to an input of the power factor correction stage, a second terminal of the diode is connected to the first plate of the capacitor, and the second plate of the capacitor is connected to the other input of the PFC stage;
the discharge means is connected to the capacitor and is configured to discharge the capacitor such that it contributes to the output of the PFC stage when the level of a signal at the input of the PFC stage falls below a threshold value;

the circuit further comprising:
a charge pump diode; and
a charge pump capacitor;
wherein a first terminal of the charge pump diode is connected to the diode, or first and second diodes, and a second terminal of the charge pump diode is connected to the first plate of the capacitor, and a first plate of the charge pump capacitor is connected to the first terminal of the charge pump diode, and a second plate of the charge pump capacitor is connected to the discharge means.

2. A circuit comprising:
   a rectification module having a first input, a second input, a DC output and a ground output;
   a power factor correction stage having a first input, a second input, a DC output and a ground output;
   wherein the DC output of the rectification module is connected to the first input of the power factor correction stage and the ground output of the rectification module is connected to the second input of the power factor correction stage;
the circuit further comprising:
   a first diode;
   a second diode;
   a capacitor; and
   discharge means; wherein
a first terminal of the first diode is connected to the first input of the rectification module, a first terminal of the second diode is connected to the second input of the rectification module, second terminals of the first and second diodes are both connected to the first plate of the capacitor, and the second plate of the capacitor is connected to an output of the rectification module; and wherein:
   the discharge means is connected to the capacitor and is configured to discharge the capacitor such that it contributes to the output of the PFC stage when the level of a signal at the input of the PFC stage falls below a threshold value;
the circuit comprising:
   a charge pump diode; and
   a charge pump capacitor;
wherein a first terminal of the charge pump diode is connected to the diode, or first and second diodes, and a second terminal of the charge pump diode is connected to the first plate of the capacitor, and a first plate of the charge pump capacitor is connected to the first terminal of the charge pump diode, and a second plate of the charge pump capacitor is connected to the discharge means.

3. The circuit of claim 1, wherein the discharge means comprises a discharge inductor.

4. The circuit of claim 3, wherein the discharge inductor is coupled to a PFC inductor of the power factor correction stage.

5. The circuit of claim 4, wherein the discharge inductor and PFC inductor have a turns ratio that is representative of the threshold level of the signal at the input of the power factor correction stage at which the discharge means is configured to start to contribute to the output of the power factor correction stage.

6. The circuit of any one of claim 3, wherein the discharge means comprises a discharge diode connected between the discharge inductor and the capacitor.

7. The circuit of claim 1, wherein the power factor correction stage is a boost converter, a buck converter, a flyback converter, or any other converter that has an inductor.

8. The circuit of claim 3, wherein the power factor correction stage is a flyback converter having a transformer, and the inductor is provided as a second primary winding of the transformer of the flyback converter.

9. The circuit of claim 1, wherein the discharge means comprises a switch and a controller configured to operate the switch.

10. The circuit of claim 9, wherein the controller is configured to operate the switch so that it is closed for a period of time relative to a zero-crossing of a signal received at an input of the rectification module.

11. The circuit of claim 9, wherein the controller is configured to process a signal received at an input of the rectification module and/or a signal at the DC output of the rectification module and/or a signal at the DC input and/or output of the power factor correction stage in order to determine when to operate the switch.

12. A method of operating a circuit, the circuit comprising:
   a power factor correction stage having a DC input, a ground input, a DC output and a ground output;
   a capacitor;
   a diode; and
   discharge means; wherein
a first terminal of the diode is connected to an input of the power factor correction stage, a second terminal of the diode is connected to the first plate of the capacitor, and the second plate of the capacitor is connected to the other input of the PFC stage;
   the discharge means is connected to the capacitor;
the circuit further comprising:
   a charge pump diode; and
   a charge pump capacitor;
wherein a first terminal of the charge pump diode is connected to the diode, or first and second diodes, and a second terminal of the charge pump diode is connected to the first plate of the capacitor, and a first plate of the charge pump capacitor is connected to the first terminal of the charge pump diode, and a second plate of the charge pump capacitor is connected to the discharge means;
the method comprising:
   discharging the capacitor such that it contributes to the output of the PFC stage when the level of a signal at the input of the PFC stage falls below a threshold value; and
   charging the capacitor during a whole cycle of an AC signal received at the rectification module.

13. A method of operating a circuit, the circuit comprising:
   a rectification module having a first input, a second input, a DC output and a ground output;
   a power factor correction stage having a first input, a second input, a DC output and a ground output;
   wherein the DC output of the rectification module is connected to the first input of the power factor correction stage and the ground output of the rectification module is connected to the second input of the power factor correction stage;
the circuit further comprising:
   a first diode;
   a second diode;
   a capacitor; and
   discharge means; wherein
a first terminal of the first diode is connected to the first input of the rectification module, a first terminal of the second diode is connected to the second input of the rectification module, second terminals of the first and second diodes are both connected to the first plate of the capacitor, and the second plate of the capacitor is connected to an output of the rectification module; and wherein:
   the discharge means is connected to the capacitor;

the circuit further comprising:
a charge pump diode; and
a charge pump capacitor,
wherein a first terminal of the charge pump diode is connected to the diode, or first and second diodes, and a second terminal of the charge pump diode is connected to the first plate of the capacitor, and a first plate of the charge pump capacitor is connected to the first terminal of the charge pump diode, and a second plate of the charge pump capacitor is connected to the discharge means;
the method comprising:
discharging the capacitor such that it contributes to the output of the PFC stage when the level of a signal at the input of the PFC stage falls below a threshold value; and
charging the capacitor during a whole cycle of an AC signal received at the rectification module.

14. The method of claim 12, further comprising determining that the level of a signal at the input of the PFC stage falls below a threshold value by identifying a period of time relative to a phase of an input signal.

15. The method of claim 13, further comprising determining that the level of a signal at the input of the PFC stage falls below a threshold value by identifying a period of time relative to a phase of an input signal.

* * * * *